(12) United States Patent
Ono et al.

(10) Patent No.: US 6,312,163 B1
(45) Date of Patent: Nov. 6, 2001

(54) OPTICAL FIBER CONNECTOR

(75) Inventors: Miki Ono; Yoshihiro Someno, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/484,070

(22) Filed: Jan. 18, 2000

(30) Foreign Application Priority Data

Jan. 18, 1999 (JP) .................................................. 11-009643

(51) Int. Cl.$^7$ ....................................................... G02B 6/38
(52) U.S. Cl. .............................. 385/70; 385/35; 385/55; 385/33
(58) Field of Search .......................... 385/60, 61, 70–72, 385/77–79, 35, 50, 55, 98, 33

(56) References Cited

U.S. PATENT DOCUMENTS

| | | | |
|---|---|---|---|
| 4,119,362 | * 10/1978 | Holzman | 385/74 |
| 4,925,267 | * 5/1990 | Plummer | 385/74 |
| 5,185,836 | * 2/1993 | Baker | 385/61 |
| 5,661,832 | 8/1997 | Yonemura | 385/88 |

* cited by examiner

*Primary Examiner*—Brian Healy
*Assistant Examiner*—Scott Knauss
(74) *Attorney, Agent, or Firm*—Brinks Hofer Gilson & Lione (57) ABSTRACT

The optical fiber connector of the invention includes two optical fibers facing to each other, in which one optical fiber of the two has a spherical end face, when the core diameter of the optical fiber having the spherical face is given by E1, the numerical aperture thereof by NA1, the refractive index by n1, the radius of curvature of the spherical face by r, the core diameter of the other optical fiber by E2, the distance between the two optical fibers by L, the focal length f of the optical fiber is expressed by $f=r/(n1-1)$. Further, when the beam diameter on the end face of the optical fiber is given by Es, the beam diameter $Es=2 \cdot L \cdot \tan(\sin^{-1} \cdot NA1)$ is deduced, and the connection efficiency η of the two optical fibers satisfies the following inequality:

$$E2/(E1+Es) < \eta < (E2/(Es+(L/f-1) \cdot E1))^2 \leq 1.0,$$

in the focal length $f \leq L$; or

$$E2/(E1+Es) < \eta < (E2/(Es+(1-L/f) \cdot E1))^2 \leq 1.0,$$

in the focal length $f > L$.

2 Claims, 6 Drawing Sheets

OPTICAL FIBER CONNECTOR

BACKGROUND OF THE INVENTION

1. Field of the Invention

The present invention relates to a connection structure for optical fibers, specifically to an optical fiber connector that makes an optical connection between two optical fibers without using a lens member.

2. Description of the Related Art

In connecting optical fibers, the most important technical task is to achieve a low transmission loss.

Figure 14:
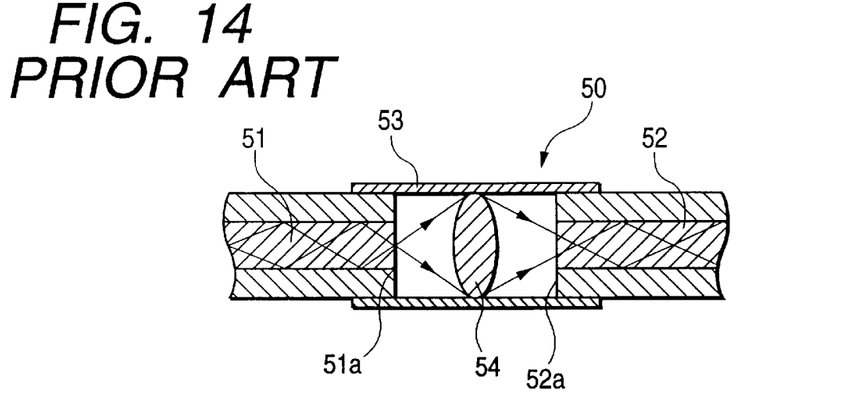
FIG. 14 is a sectional view of a first conventional optical fiber connector.

FIG. 14 illustrates a first conventional optical fiber connector 50 that has implemented a structure with a low transmission loss. As illustrated, the first conventional optical fiber connector 50 includes a cylindrical enclosure 53, and a biconvex lens 54 contained in this enclosure 53, in which one end of a first optical fiber 51 is installed in one end of the enclosure 53, and one end of a second optical fiber 52 is installed in the other end of the enclosure 53. Incident light from the one end face (not illustrated) of the first optical fiber 51 transmits through the first optical fiber to exit the other end face 51a, and, after passing through the lens 54, the light converges on the end face 52a of the optical fiber 52.

Figure 15:
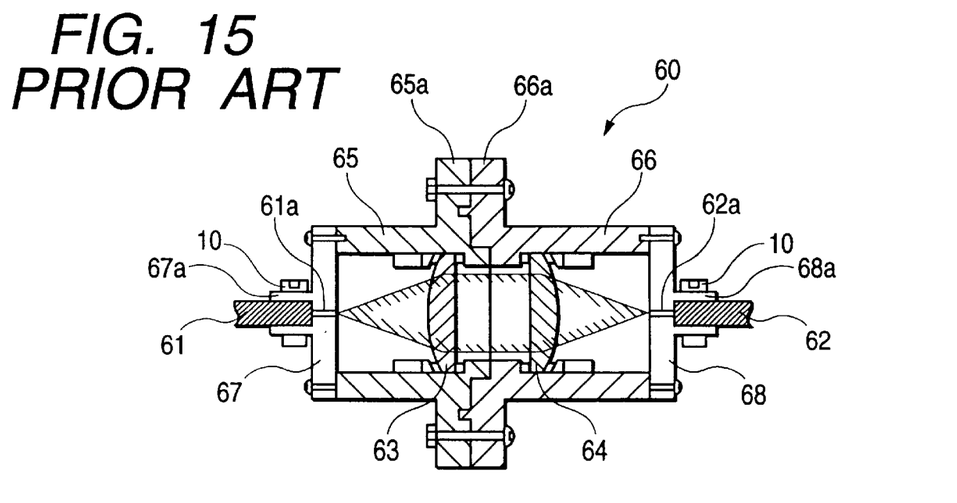
FIG. 15 is a sectional view of a second conventional optical fiber connector.

FIG. 15 illustrates a second conventional optical fiber connector 60, which includes a first cylindrical connecting part 65 with a flange 65a and a second cylindrical connecting part 66 with a flange 66a, and a first lens 63 contained in the first connecting part 65 and a second lens 64 contained in the second connecting part 66.

First and second disk-shaped fixing parts 67, 68 provided with protrusions 67a, 68a having small holes in the centers thereof are mounted onto the ends of the opposite sides to the flanges 65a, 66a of the first and second connecting parts 65, 66. One end of each of the first optical fiber 61 and the second optical fiber 62 are guided in the center holes of the fixing parts 67, 68.

First and second lenses 63, 64 are fixed inside the first and second connecting parts 65, 66, respectively, so that the optical axes coincide with each other; and thereafter, the first and second connecting parts 65, 66 are attached so that the flanges 65a, 66a are engaged with each other. The first and second fixing parts 67, 68 are fastened to the first and second connecting parts 65, 66 with screws, etc. The first and second optical fibers 61, 62 are stripped of the sheathing parts from the front ends thereof, and these ends 61a, 62a each are engaged in the center holes of the fixing parts 67, 68.

In the optical fiber connector 60 thus configured, in order to form the focuses on the end faces of the ends 61a, 62a of the first and second optical fibers 61, 62, for example, a light beam emitted from the end face of the end 61a of the first optical fiber 61 falls on the first lens 63, and goes out as a parallel beam from the first lens 63, and the parallel beam falls on the second lens 64. Then, the outgoing light from the second lens 64 falls on the end face of the end 62a of the second optical fiber 62.

However, in such optical fiber connectors 50, 60, a high positioning accuracy in the connection of the two optical fibers is required in order to transmit a stable light beam through the optical fibers. Further, in order to enhance the efficiency of optical connection through the optical elements such as the lenses and achieve a lower transmission loss than that obtained by directly connecting the optical fibers, it is necessary to fix the lenses 54, 63, 64 inside the enclosures 53, 65, 66, align the focal positions of the lenses 54, 63, 64, and adjust the positioning. Accordingly, it takes a large amount of time for the positioning adjustment.

SUMMARY OF THE INVENTION

The present invention has been made in view of these problems, and it is an object of the invention to provide an optical fiber connector that achieves a low transmission loss and a high efficiency of optical connection without requiring a lens member.

As a first means to solve at least one of the foregoing problems, the optical fiber connector of the invention includes two optical fibers facing to each other, in which one optical fiber of the two on the light emitting side has a spherical front part. In the optical fiber connector thus configured, provided that the core diameter of the optical fiber having the spherical front part is given by E1, the numerical aperture thereof by NA1, the refractive index by n1, the radius of curvature of the spherical front part by r, the core diameter of the optical fiber on the other light receiving side by E2, the distance between the two optical fibers by L, the focal length f of the optical fiber on the light emitting side is expressed by $f=r/(n1-1)$, and provided that the beam diameter on the end face of the optical fiber on the light receiving side is given by Es, the beam diameter $Es=2 \cdot L \cdot \tan(\sin^{-1} \cdot NA1)$ is deduced, and the connection efficiency $\eta$ of the two optical fibers satisfies the following inequality:

$$E2/(E1+Es) < \eta < (E2/(Es+(L/f-1) \cdot E1))^2 \leq 1.0,$$

in the focal length $f \leq L$; or $$E2/(E1+Es) < \eta < (E2/(Es+(1-L/f) \cdot E1))^2 \leq 1.0,$$

in the focal length $f > L$.

As a second means, the optical fiber having the spherical face is formed with at least a second radius of curvaturers, which becomes smaller than the radius of curvature r, as the radius approaches the periphery of the core from the center thereof.

DESCRIPTION OF THE PREFERRED EMBODIMENTS

Figure 1:
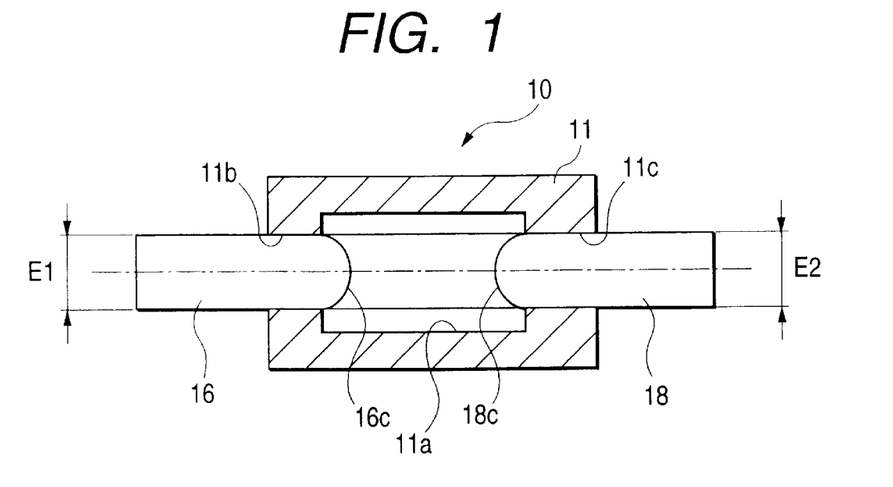
FIG. 1 is a typical sectional view of an optical fiber connector of the invention.

An optical fiber connector 10 as the first embodiment of this invention is provided with, as shown in FIG. 1, a cylindrical enclosure 11 made of a synthetic resin or a metal that does not transmit a light, cylindrical optical guide path 11a provided inside the enclosure 11, a first round hole 11b and a second round hole 11c provided on opposing ends of the enclosure 11, each connected with the optical guide path 11a.

Figure 2:
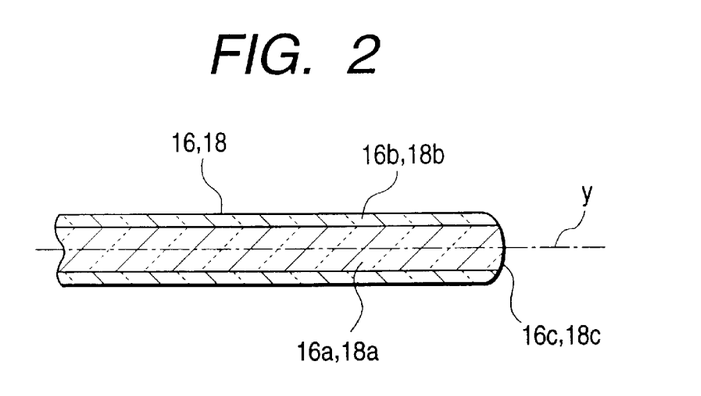
FIG. 2 is a sectional view of a plastic fiber that is attached to the connector.

Plastic fibers (POF) 16, 18 are constructed, as shown in FIG. 1 and FIG. 2, cores 16a, 18a made of a high purity polymethyl methacrylate (PMMA) and clading 16b, 18b that sheathe these cores 16a, 18a, which are made of a thin layer of special fluororesin. The diameters E1, E2 of the POF 16, 18 are about 1 mm, and the front ends thereof have spherical front parts 16c, 18c that are polished to form spherical lenses with high precision.

The plastic fibers 16, 18 contain the cores 16a, 18a whose refractive indexes n1, n2 are uniform in the radial direction, and allow long distance propagation of light while absorptions and scatterings attenuate the light gradually, which is the so-called multi-mode type (MMF).

One end of the POF 16, 18 each are made to be detachably fit in the first and second round holes 11b, 11c of the enclosure 11.

In this optical fiber connector 10, as shown in FIG. 1, a light beam fallen on one end face (not shown) of the core 16a of the POF 16 propagates through the core 16a, and reaches the spherical front part 16c, the other end face. An outgoing beam from the spherical front part 16c transmits through the space inside the guide optical path 11a, and falls on the other spherical front part 18c of the core 18a of the POF 18.

In this manner, bidirectional communication of information is made through the optical fiber connector, between a transmitting end (not illustrated) and a receiving end remotely located (not illustrated). The receiving end converts light signal into an electrical signal, thus the information can be received.

Next, in the optical fiber connector 10, the optimization condition for connecting two optical fibers will be discussed with the following models.

Here, the POF 16 is assumed as the emitting side optical fiber, and the POF 18 as the receiving side optical fiber; and the optimization condition on the emitting side will be explained mainly with regard to the POF 16.

Figure 3:
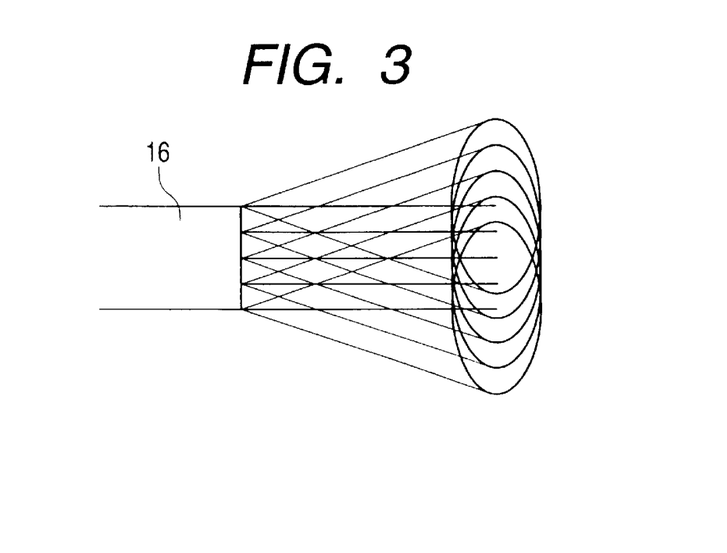
FIG. 3 is a drawing in which a fiber end face of the optical fiber connector of the invention is flat.

Assuming that the end face of the POF 16 is flat, as shown in FIG. 3, light beams that fall on the one end of the POF 16, transmit through the core 16a, and go out from the other end face thereof are considered to be emitted as a plurality of virtually parallel light beams, as illustrated by the principal rays (thick lines), and form focuses at different positions.

Figure 4:
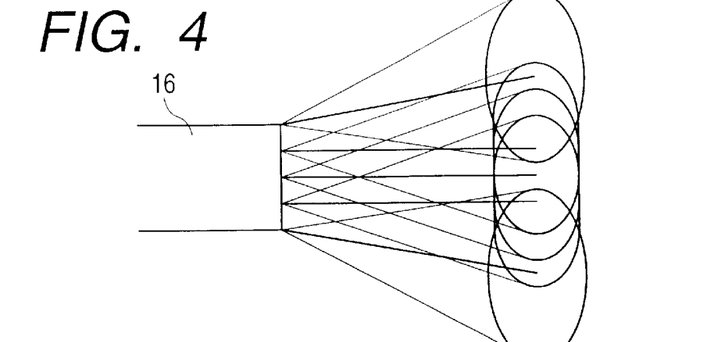
FIG. 4 is a drawing in which the fiber end face of the optical fiber connector of the invention is flat in the multimode.

However generally, as shown in FIG. 4, the principal rays become divergent on the circumference of the end face of the POF 16 due to the influence of the emission mode (multi-mode).

As shown in FIG. 4, light beams emitted from point light sources, passing through the POF 16, become uniform divergent beams without any changes effected on the paths, and form focuses, for example, at five different positions. Therefore, the light beams are equivalently considered as those emitted from the five different point sources. Namely, it is equivalent to the five focuses being generated, and the light beams emitted from the one end of the POF 16 become transmuted into those deteriorating the connection efficiency in practice, when falling on the one end face of the POF 18 not illustrated. As illustrated in FIG. 4, the exiting of the five principal rays face outer divergent directions, and increasingly deteriorate the connection efficiency.

Figure 5:
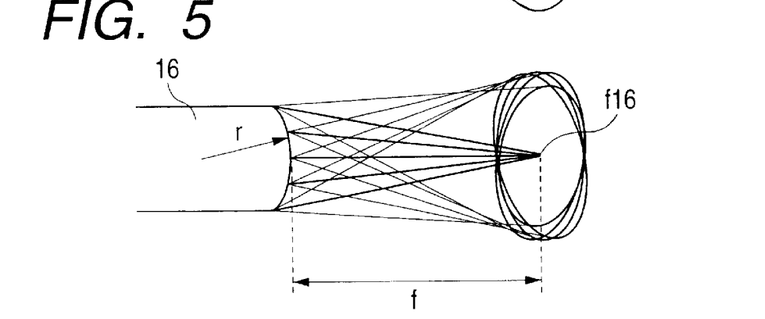
FIG. 5 is a drawing in which the fiber end face of the optical fiber connector of the invention is spherical.

Next, as shown in FIG. 5, in an optical fiber connector having the spherical front part 16c on the front of the POF 16, provided that the radius of curvature is given by r, and the refractive index of the POF 16 is given by n1, the light beams form a focus f 16 at a position given by the expression of the focal length f=r/(n1−1), and also converge at the same focal length f in an annular shape; namely, they are transmuted into two kinds of lights (convergent lights and divergent lights).

The state of the light beams shown in FIG. 5 is such that the principal rays in the thick lines are drawn toward the center of the optical axis to converge at one point by forming the flat end face of the POF 16 shown in FIG. 3 and FIG. 4 into the spherical front parts 16c, 18c, and the divergent beams are more convergent than the state in FIG. 4.

Figure 6:
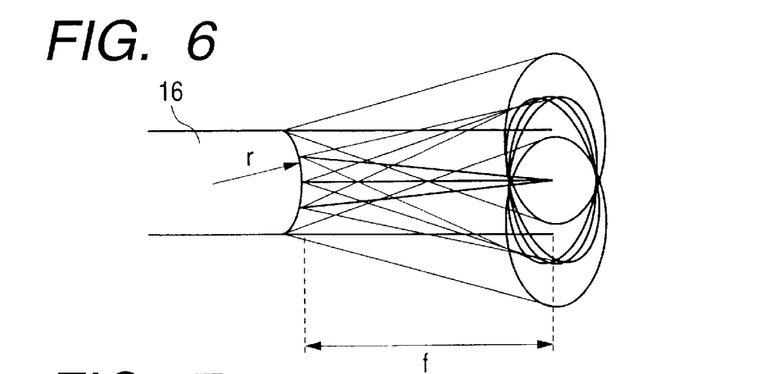
FIG. 6 illustrates the optical fiber connector of the invention in which the fiber end face is spherical, with the divergent light of FIG. 4.

Further, although POF 16, 18 have the flat end faces as shown in FIG. 4, in case of the optical fibers being a model multi-mode type, the principal rays become divergent on the periphery; and even though the front ends of the POF 16, 18 are formed into the spherical front parts 16c, 18c having a specific radius of curvature r, as shown in FIG. 6, the principal rays on the periphery do not completely converge at one point.

Thus, in the states shown in FIG. 3 through FIG. 6, the take-in efficiency of the convergent and divergent lights by the receiving side fiber, namely the POF 18, will be explained as follows, by using the relation of the beam size at the position of the POF 18, described later, with the core diameter E2 of the POF 18.

Figure 8:
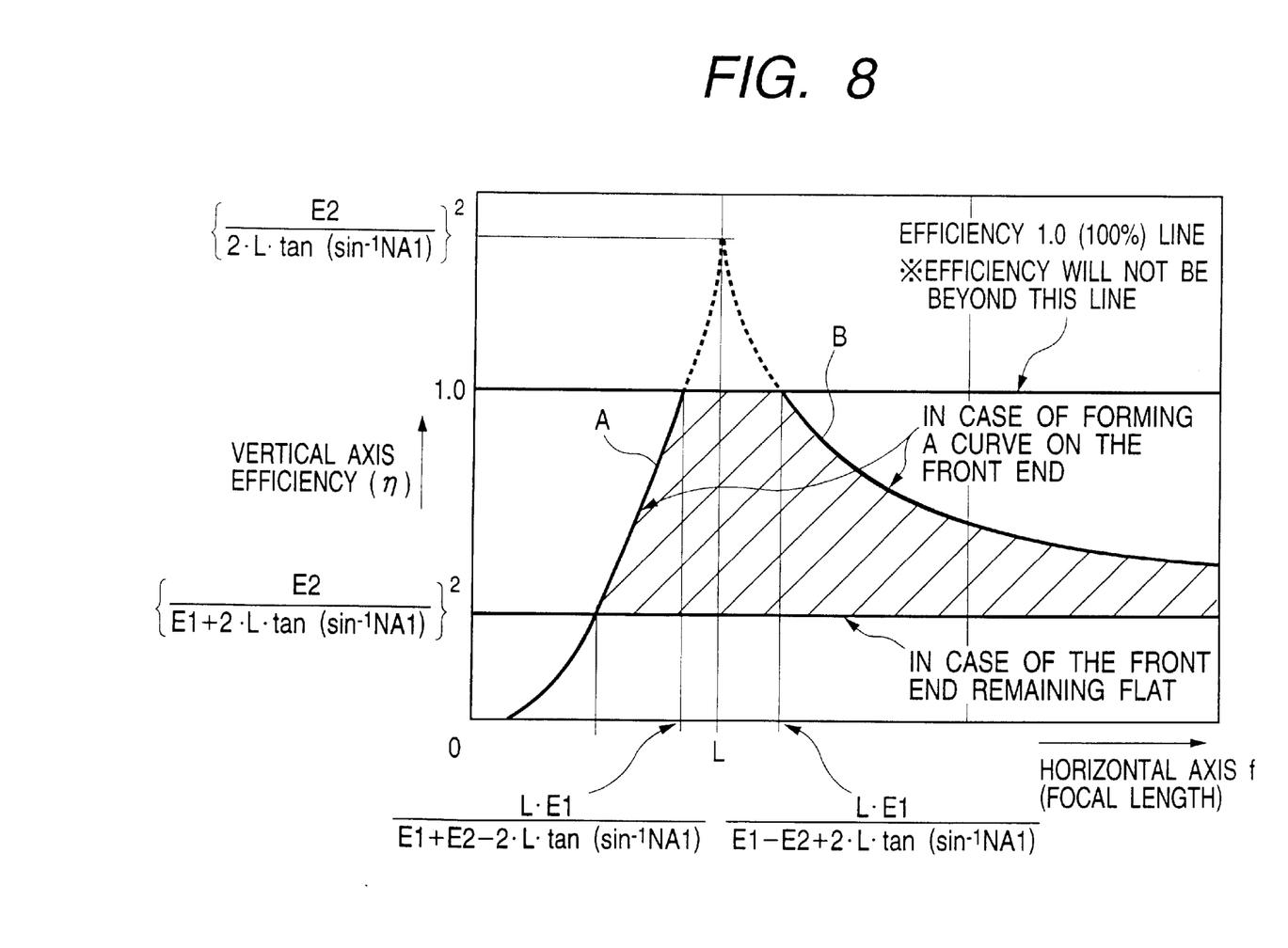
FIG. 8 is a graph to illustrate the connection efficiency of the optical fiber connector of the invention.

FIG. 8 illustrates the relation between the focal length f and the connection efficiency η of the optical fiber connector 10 of the invention, in which the horizontal axis plots samples by the characteristic four factors (core diameters E1, E2, a length L between the POF 16 and the POF 18, and a numerical aperture NA1), and the vertical axis plots the corresponding connection efficiency η between the POF 16 and the POF 18.

In FIG. 8, provided that the refractive index of the POF 16 is given by n1 and the radius of curvature of the spherical front part 16c is given by r, the focal length f is expressed as follows.

$$f = r/(n1-1) \quad (1)$$

In FIG. 8, the curve A illustrates a case in which the focal length f of the POF 16 is smaller than the distance L between the two optical fibers, which shows that the light receiving loss at the POF 18 being the receiving side fiber resulting from the divergent lights lowers the connection efficiency η.

The curve B illustrates a case in which the focal length f is larger than the distance L between the two optical fibers, which shows that the loss of light resulting from two stepped divergent lights lowers the connection efficiency η.

Considering that the connection efficiency η does not exceed 100%, the connection efficiency η includes the following three ranges: namely, 1) a range in which the distance L between the optical fibers is greater than the focal length f, 2) a range in which the distance L between the optical fibers is smaller than the focal length f, 3) a range in which the distance L between the optical fibers is equal to, or approximate to the focal length f.

Assuming that the end faces of the POF 16, 18 are made flat, the beam size E of a light emitted from the POF 16 at the end-face position of the POF 18 having the core diameter E2, detached by the distance L, is deduced from the area ratio as follows.

$$\eta = (E2/E)^2 \tag{2}$$

Therefore, in this optical fiber connector (having flat end faces), when the core diameter E2 of the POF 18 is sufficiently large and the beam size E is included inside the core diameter E2, the connection efficiency η becomes equal to 1.0 (100%).

Figure 9:
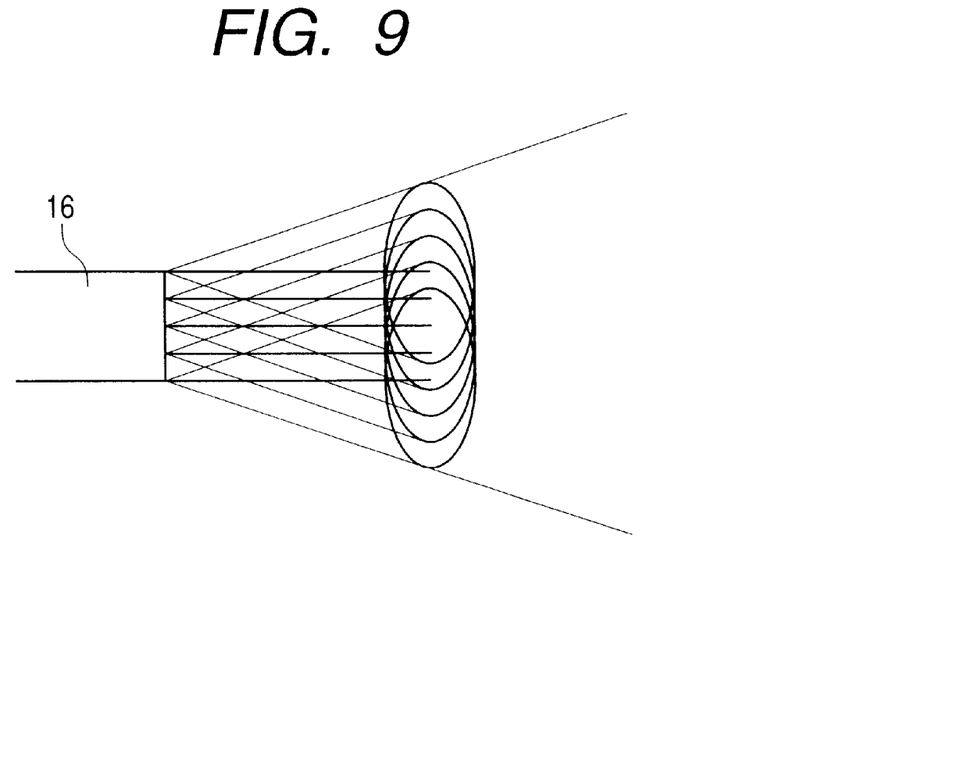
FIG. 9 is a drawing in which the fiber end face of the optical fiber connector of the invention is flat.
Figure 11:
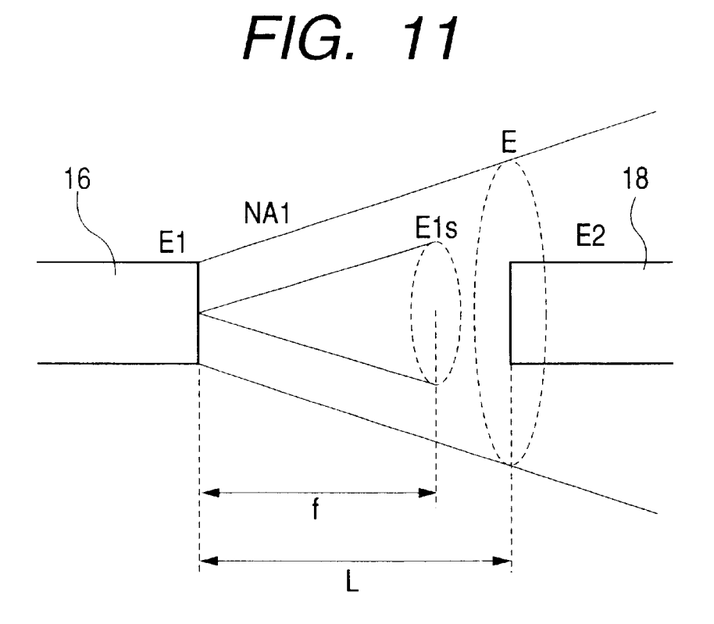
FIG. 11 is a typical drawing to explain the divergent beam (beam size), shown in FIG. 9, of the optical fiber connector of the invention.

In the optical fiber connector shown in FIG. 11, which is a typical illustration of FIG. 9, the beam size E, since the light beams are divergent, is given by the following expression.

$$E = E1 + 2 \cdot L \cdot \tan(\sin^{-1} NA1) \tag{3}$$

Provided that the beam size of a light emitted from the POF 16 at the focal length f is given by E1s, since the light beams are uniformly divergent, E1s is given by the following expression.

$$E1s = 2 \cdot f \cdot \tan(\sin^{-1} NA1) \tag{4}$$

Figure 10:
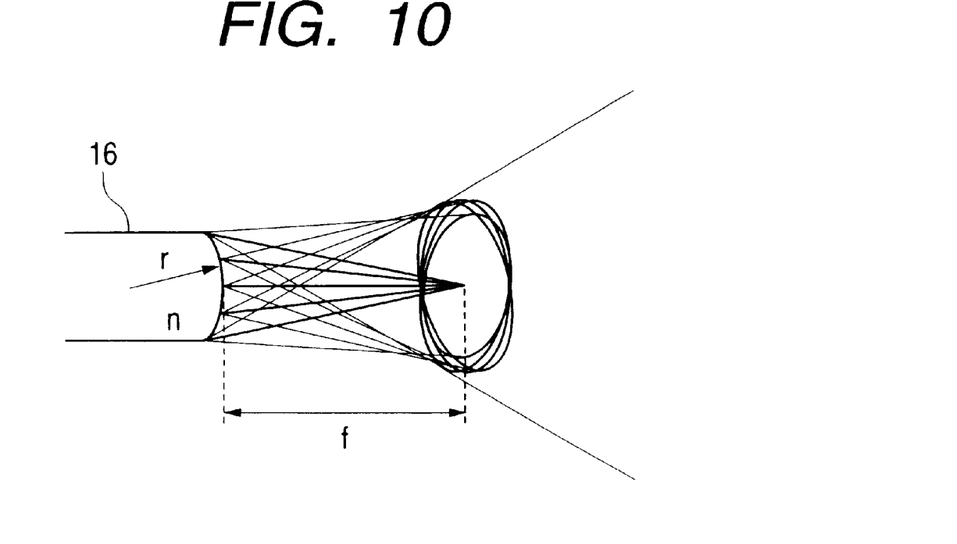
FIG. 10 is a drawing in which the fiber end face of the optical fiber connector of the invention is spherical.
Figure 12:
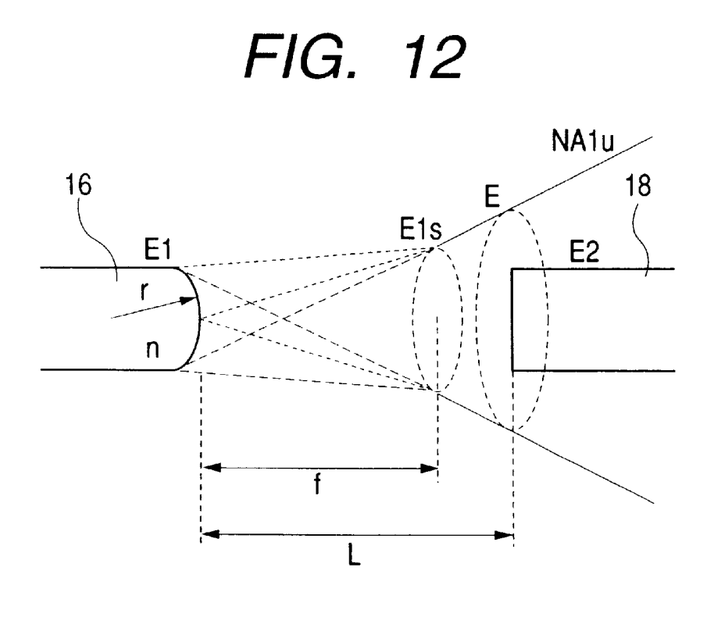
FIG. 12 is a typical drawing in which a two-stage divergent beam (beam size), shown in FIG. 10, is generated in the optical fiber connector of the invention.

Next, part of the optical fiber connector 10 shown in FIG. 10 has a two-stepped divergent light beam at the focal length f as the border, since the end face of the POF 16 is made into the spherical front part 16c, as shown in FIG. 12.

Therefore, the expression that defines the beam size E is obtained by the relation of the distance L between the fibers against the focal length f, as follows.

1) a range within which the distance L between the fibers is larger than the focal length f ($0 \leq f < L$):

The beam size E is given by the following expression in this range.

$$E = E1 + L/f \cdot (E1s - E1) \tag{5}$$

Therefore, the optical connection efficiency η is expressed by substituting the expression (5) into the expression (2).

$$\eta = (E2/E)^2 \tag{6}$$

$$= (E2/(E1 + L/f \cdot (E1s - E1)))^2$$

-continued
$$= (E2/((1 - L/f) \cdot E1 + 2 \cdot L \cdot \tan(\sin^{-1} NA1)))^2$$

This corresponds to the curve A in FIG. 8.

2) a range within which the distance L between the fibers is smaller than the focal length f (f>L):

The beam size E is given by the following expression in this range.

$$E = E1s + 2 \cdot (L-f) \cdot \tan(\sin^{-1} NA1u) \tag{7}$$

Here, NAu represents the numerical aperture of the second stepped divergent beam, as illustrated in FIG. 2.

NAu is the sum of the numerical apertures NA by the angle a and the angle β.

Figure 13:
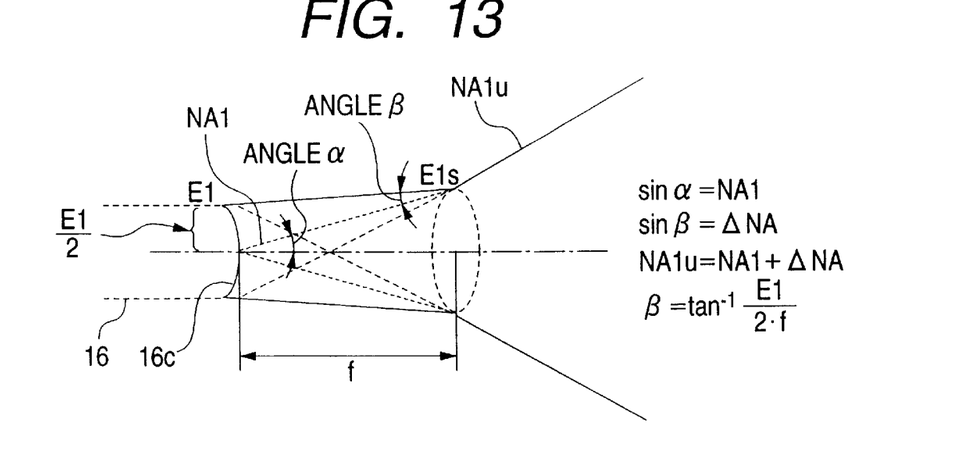
FIG. 13 is a typical drawing explaining the numerical aperture shown in FIG. 12.

As shown in FIG. 13, the numerical aperture by the angle α is NA1. On the other hand, the numerical aperture NA1u by the angle β is given by the following expression, using the core diameter E1 and the focal length f of the POF 16.

$$\sin \alpha = NA1 \tag{8}$$

$$\sin \beta = \Delta NA \tag{9}$$

$$\beta = \tan^{-1} \Delta E1/2f \tag{10}$$

The numerical aperture NA1u is expanded using the angle β by using the expression (9) and the expression (10), and expressed as follows.

$$NA1u = NA1 + \Delta NA \tag{11}$$

$$= NA1 + \sin(\tan^{-1} E1/2f) \tag{12}$$

Therefore, the connection efficiency η is expressed as follows, by expanding to substitute the expression (7) and the expression (4) for the expression (2)

$$\eta = (E2/E)^2 \tag{13}$$

$$= (E2/(E1s + 2 \cdot (L-f) \cdot \tan(\sin^{-1} NA1u)))^2$$

$$= (E2/(2f \cdot \tan(\sin^{-1} NA1) + 2(L-f) \cdot \tan(\sin^{-1}(NA1 + \sin(\tan^{-1} E1/2f)))))^2$$

$$= (E2/(2f \cdot \tan(\sin^{-1} NA1) + 2(L-f) \cdot \tan(\sin^{-1}(NA1 + E1/2f))))^2$$

This corresponds to the curve B in FIG. 8.

Next, as shown in FIG. 8 and FIG. 11 through FIG. 13, when the front ends of the POF 16, 18 are flat, the connection efficiency of the optical fiber connector 10 is obtained from the expression (3):

$$\eta = (E2/E)^2 = (E2/(E1 + 2L \cdot \tan(\sin^{-1} NA1)))^2 \tag{14}$$

Therefore, it is necessary that the connection efficiency exceeds the connection efficiency η by this expression (14).

The focal length f when the connection efficiency η is 1.0 (100%) in the curve A, B in FIG. 8 is deduced from the expression (6) and the expression (13) as follows.

$$f = L \cdot E1/(E1 + E2 - 2 \cdot L \cdot \tan(\sin^{-1} NA1)) \tag{15}$$

$$f = L \cdot E1/(E1 - E2 + 2 \cdot L \cdot \tan(\sin^{-1} NA1)) \tag{16}$$

In FIG. 8, the intersection by the curve A and B is positioned where the focal length f is equal to L, and the following is deduced from the expression (6) and the expression (16):

$$\eta = (E2/2L \cdot \tan(\sin^{-1} NA1))^2 \quad (17)$$

Here, the connection efficiency $\eta \leq 1.0$ (100%), and $\eta$ will not exceed 1.0.

In such an optical fiber connector, when the transmission loss of the optical fiber itself is considered, preferably the connection efficiency $\eta$ is more than 0.5~0.6, and most preferably, a transmission loss of about 3 dB is achieved.

Next, in the optical fiber connector 10, the center areas of the spherical front parts 16c, 18c of the POF 16, 18 are formed into spherical shapes a radius of curvature r, and the peripheral areas of the spherical front parts 16c, 18c are formed into spherical shapes with a radius of curvaturers which is smaller than r. Thus, the front end faces of the POF 16, 18 are formed into a spherical shapes, which will be explained hereafter.

Figure 7:
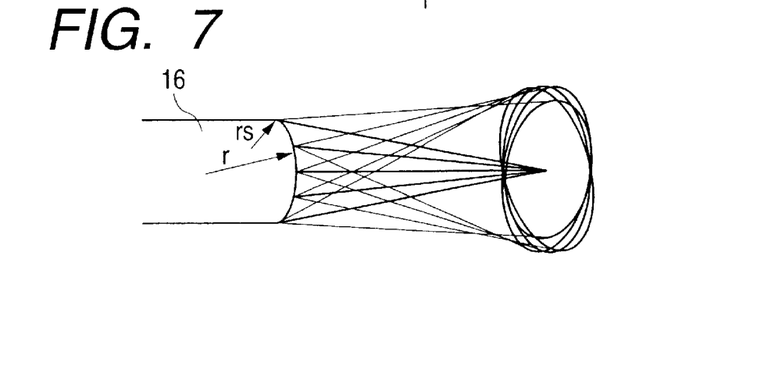
FIG. 7 illustrates the optical fiber connector of the invention in which the radius of curvature is different on the circumference.

As shown in FIG. 7, in order to converge the principal rays from the peripheral areas of the spherical front parts 16c, 18c of the POF 16, 18 into a point, the optical fiber connector 10 as another embodiment of the invention is provided with a radius of curvaturers on the peripheral areas of the cores 16a, 18c, which is smaller than the radius of curvature r provided on the center areas thereof.

Comparing the case of the radius of curvaturers provided on the peripheral areas to the case provided with the radius of curvature r only, the peripheries of the front ends of the cores are formed to curve slightly toward the insides of the cores.

To give such a shape to the peripheries will converge the light beams emitted from the peripheries of the cores 16a, 18a so as to form a focus, thereby reducing the deterioration, of the connection efficiency even more significantly, in the connection of the POF 16, 18.

Thus, in case of the end faces of the optical fibers being made spherical, as shown in FIG. 8, the relevant factors within the range shown by the slant lines will effect a satisfactory connection efficiency. Therefore, to set the values so as to satisfy the above will achieve the optical fiber connector of the invention.

As described above, the optical fiber connector of the invention includes two optical fibers facing to each other, in which one optical fiber of the two on the light emitting side has a spherical front part. In this configuration, provided that the core diameter of the optical fiber having the spherical front part is given by E1, the numerical aperture thereof by NA1, the refractive index by n1, the radius of curvature of the spherical front part by r, the core diameter of the optical fiber on the other light receiving side by E2, the distance between the two optical fibers by L, the focal length f of the optical fiber on the light emitting side is expressed by f=r/(n1−1). Further, provided that the beam diameter on the end face of the optical fiber on the light receiving side is given by Es, the beam diameter Es=2·L·tan(sin⁻¹NA1) is deduced, and the connection efficiency $\eta$ of the two optical fibers satisfies the following inequality:

$$E2/(E1+Es) < \eta < (E2/(Es+(L/f-1)\cdot E1))^2 \leq 1.0,$$

in the focal length f>L; or $$E2/(E1+Es) < \eta < (E2/(Es+(1-L/f)\cdot E1))^2 \leq 1.0,$$

in the focal length f>L.

Thereby, the optical fiber connector of the invention is able to achieve a higher connection efficiency than the one having the end faces of the optical fibers flattened.

Further, the optical fiber having the spherical front part is formed with at least a second radius of curvaturers, which becomes smaller than the radius of curvaturer, as the radius approaches the periphery of the core from the center thereof.

Thereby, the divergent beams from the peripheral areas converge at one point more intensively, which achieves a still higher improvement of the connection efficiency.

What is claimed is:

1. An optical fiber connector comprising two optical fibers facing to each other, in which one optical fiber of the two on the light emitting side has a spherical front part, when a core diameter of the optical fiber having the spherical front part is given by E1, a numerical aperture thereof by NA1, a refractive index by n1, a radius of curvature of the spherical front part by r, a core diameter of the optical fiber on the other light receiving side by E2, a distance between the two optical fibers by L, a focal length f of the optical fiber on the light emitting side is expressed by f=r/(n1−1), and when a beam diameter on an end face of the optical fiber on the light receiving side is given by Es, the beam diameter Es=2·L·tan (sin⁻¹NA1) is deduced, and a connection efficiency $\eta$ of the two optical fibers satisfies the following inequality:

$$E2/(E1+Es) < \eta < (E2/(Es+(L/f-1)\cdot E1))^2 \leq 1.0,$$

in the focal length f≦L; or $$E2/(E1+Es) < \eta < (E2/(Es+(1-L/f)\cdot E1))^2 \leq 1.0,$$

in the focal length f>L.

2. An optical fiber connector according to claim 1, wherein the optical fiber having the spherical front part is formed with at least a second radius of curvaturers, which becomes smaller than the radius of curvaturer, as the radius approaches the periphery of the core from the center thereof.

* * * * *

UNITED STATES PATENT AND TRADEMARK OFFICE
CERTIFICATE OF CORRECTION

PATENT NO.    : 6,312,163 B1
DATED         : November 6, 2001
INVENTOR(S)   : Miki Ono et al.

It is certified that error appears in the above-identified patent and that said Letters Patent is hereby corrected as shown below:

<u>Column 8,</u>
Line 47, delete "curvaturers," and substitute -- curvature rs, -- in its place.
Line 48, delete "curvaturer," and substitute -- curvature r, -- in its place.

Signed and Sealed this

Eleventh Day of March, 2003

JAMES E. ROGAN
*Director of the United States Patent and Trademark Office*